United States Patent Office 3,130,201
Patented Apr. 21, 1964

3,130,201
PEROXIDES OF 3,5,5-TRIMETHYL DIOXOLANE-(1,2) AND PROCESS OF MAKING SAME
Alfred Rieche, Berlin-Wendenschloss, Ernst Schmitz, Berlin-Altglienicke, and Egon Gruendemann, Berlin-Lichtenberg, Germany, assignors to Elektrochemische Werke Muenchen Aktiengesellschaft, Munich, Germany, a corporation of Germany
No Drawing. Filed Nov. 15, 1960, Ser. No. 69,260
10 Claims. (Cl. 260—340.9)

The present invention relates to 3,5,5-trimethyl dioxolane-(1,2) compounds and more particularly to peroxides of 3,5,5-trimethyl dioxolane-(1,2), and to a process of making same.

It is one object of the present invention to provide new and valuable peroxides of 3,5,5-trimethyl dioxolane-(1,2).

Another object of the present invention is to provide a simple and effective process of producing such peroxides of 3,5,5-trimethyl dioxolane-(1,2).

Other objects of the present invention and advantageous features thereof will become apparent as the description proceeds.

In principle the present invention is concerned with compounds of the following Formula I:

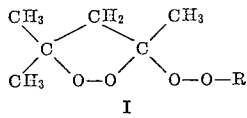

In said formula R indicates an alkyl radical, a cycloalkyl radical, an (1-alkoxy)-alkyl radical or an aralkyl radical and preferably a lower alkyl radical such as the ethyl, propyl, butyl, amyl, and the like lower alkyl radicals or the benzyl, phenyl ethyl, cumyl, the like phenyl lower alkyl radicals. R may also be the 3,5,5-trimethyl dioxolane-(1,2) radical of the following Formula II:

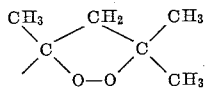

The new compounds are formed by reacting 3-hydroxy-3,5,5-trimethyl dioxolane-(1,2) of the following Formula III

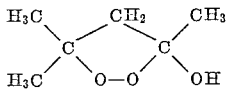

with peroxide compounds of the formula

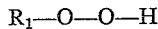

$R_1—O—O—H$ wherein $R_1$ is hydrogen or an alkyl radical or a cycloalkyl radical or an (1-alkoxy)-alkyl radical or an aralkyl radical such as hydrogen peroxide, alkyl hydroperoxide, cycloalkyl hydroperoxide, (1-alkoxy)-alkyl hydroperoxide, or aralkyl hydroperoxide. Thereby, the highly reactive 3-hydroxyl group of the starting material reacts with the peroxide whereby water is split off and yields the new peroxide of 3,5,5-trimethyl dioxolane-(1,2) of Formula I. Alkyl hydroperoxides yield, for instance, 3-alkyl peroxy-3,5,5-trimethyl dioxolanes-(1,2). Replacement of the hydroxyl group by the radical $R_1—O—O$ is considerably accelerated by the addition of small amounts of acid catalyst such as sulfuric acid, sulfonic acids, or perchloric acid. The reaction proceeds at room temperature or with gentle heating and the yield is almost quantitative.

3-hydroxy-3,5,5-trimethyl dioxolane-(1,2) which is obtained, for instance, by reaction of mesityloxide and hydrogen peroxide reacts with hydrogen peroxide to form a crystalline very stable peroxide which is identical with the so-called "mesityl oxide peroxide." The constitution of said compound was not known heretofore and it could be obtained with difficulty only. The present invention supplies a simple and highly effective process of producing the peroxide of said mesityl oxide.

The reaction proceeds according to the following equation:

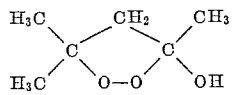 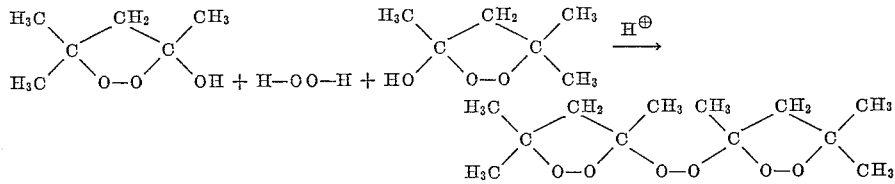

According to another embodiment of the present invention said mesityl oxide peroxide can be obtained directly be reacting diacetone alcohol in the presence of a mineral acid with hydrogen peroxide according to the following equation:

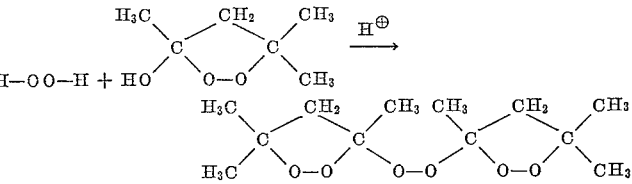

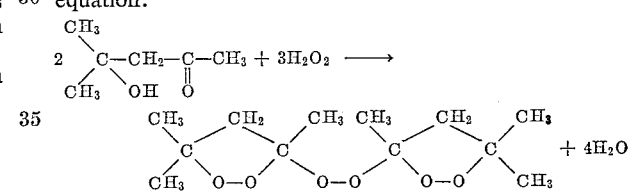

On mixing the components and allowing the mixture to stand at room temperature for a prolonged period of time, mesityl oxide peroxide precipitates in pure crystalline form.

The theory is advanced, although the reaction is not limited thereto, that first 3-hydroxy-3,5,5-trimethyl dioxolane-(1,2) of Formula III is formed in statu nascendi by the reaction of said diacetone alcohol and that two moles of said intermediate product are immediately condensed with further amounts of hydrogen peroxide to mesityl oxide peroxide.

The 3-alkyl peroxy-3,5,5-trimethyl dioxolanes-(1,2), the 3-cycloalkyl peroxy-3,5,5-trimethyl dioxolanes-(1,2), the 3-[(1-alkoxy)-alkyl peroxy] - 3,5,5 - trimethyl dioxolanes-(1,2) and the 3-aralkyl peroxy-3,5,5-trimethyl dioxolanes-(1,2) of Formula I are new compounds. They are surprisingly stable and some of them can even be distilled in a vacuum without decomposition. They represent substantially non-explosive liquids or crystalline compounds. They are useful, for instance, as activating catalysts in the polymerization of vinyl compounds. They contain two differently bound peroxide groups and, due thereto, their decomposition takes place in two steps so that special activating effects can be achieved when using them as catalysts.

The following examples serve to illustrate the present invention without, however, limiting the same thereto.

EXAMPLE 1

*3-Ethyl Peroxy-3,5,5-Trimethyl Dioxolane-(1,2)*

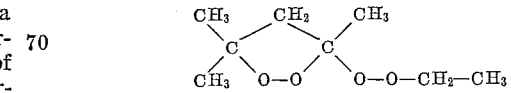

20 parts by volume of 5 N sulfuric acid are added to 13.2 parts by weight (1 mole) of 3-hydroxy-3,5,5-trimethyl dioxolane-(1,2) and 27.5 parts by volume (1 mole) of solution of ethyl hydroperoxide in water, which contains 225 mg. of the peroxide per cc. Five minutes after the addition of the sulfuric acid a water insoluble oil is formed. The reaction mixture is allowed to stand for one hour. The water insoluble reaction product is separated from the aqueous layer by means of a separating funnel. The aqueous layer is extracted with ether and the oily layer is combined with the resulting ethereal extract. The ethereal mixture is washed with 2 N sodium hydroxide solution and twice with water, dried over calcium chloride, and subjected to fractional vacuum distillation at a pressure of 17 mm. Hg. 13.4 parts by weight of 3-ethyl peroxy-3,5,5-trimethyl dioxolane-(1,2) are obtained, corresponding to a yield of about 76% of the theoretical yield.

Properties: Colorless liquid; water insoluble.
Refractive index: $n_D^{21}$=1.4249.
Boiling point: 72–76° C./17 mm.

EXAMPLE 2

*3-Cumyl Peroxy-3,5,5-Trimethyl Dioxolane-(1,2)*

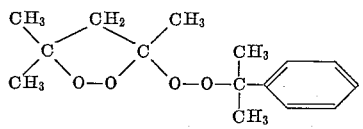

20 parts by volume of a 5 N sulfuric acid are added to 13.2 parts by weight (1 mole) of 3-hydroxy-3,5,5-trimethyldioxolane-(1,2) and 15.2 parts by weight (1 mole) of cumene hydroperoxide at room temperature. The reaction mixture is shaken for 6 hours. 75 parts by volume of ether are added thereto. The resulting ethereal solution is washed with 2 N sodium hydroxide solution and twice with water, dried over calcium chloride, and subjected to fractional distillation after removing the ether by evaporation in a high vacuum between 0.02 mm. Hg and 0.05 mm. Hg. 21.3 parts by weight of a yellowish oil remain as distillation residue corresponding to a yield of 80% of the theoretical yield.

Properties: Yellowish oil which cannot be distilled.
Refractive index: $n_D^{21}$=1.4955.

EXAMPLE 3

*3-Tertiary Butyl Peroxy-3,5,5-Trimethyl Dioxolane-(1,2)*

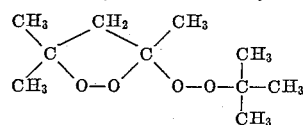

I. By means of sulfuric acid: 20 parts by volume of 5 N sulfuric acid are added to 13.2 parts by weight (1 mole) of 3-hydroxy-3,5,5-trimethyl dioxolane-(1,2) and 9 parts by weight (1 mole) of tertiary butyl hydroperoxide. The reaction mixture is shaken at room temperature for 6 hours. Then 75 parts by volume of ether are added to the mixture and the resulting two layers are separated in a separating funnel. The ethereal layer is washed with 2 N sodium hydroxide solution and twice with water and is dried over calcium chloride. The ether is distilled off in a vacuum of 15 mm. Hg and the residue is subjected to fractional distillation by means of a fractionating column. The yield is 17.5 parts by weight corresponding to a yield of 85% of the theoretical yield.

Properties: Colorless liquid.
Refractive index: $n_D^{21}$=1.4280.
Boiling point: 79–80° C./14 mm. Hg.

II. By means of p-toluene sulfonic acid: The procedure is the same as described hereinabove in Example 3, I, whereby, however, 20 parts by weight of a 50% by weight solution of p-toluene sulfonic acid in water is used in place of 5 N sulfuric acid. The yield is 85% of the theoretical yield.

EXAMPLE 4

*Mesityl Oxide Peroxide*

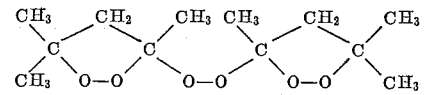

The precipitated mesityl oxide peroxide is filtered off and the aqueous filtrate is extracted with ether. The ethereal extract is dried over calcium chloride and the ether is distilled off in the vacuum of water jet vacuum pump. The residue is mesityl oxide peroxide and is put together with the precipitated mesityl oxide peroxide. 6.3 parts by weight are obtained corresponding to a yield of 93% of the theoretical yield.

The resulting peroxide is recrystallized three times from benzine. Its melting point is 123° C.

EXAMPLE 5

*3-n-Octyl Peroxy-3,5,5-Trimethyl Dioxolane-(1,2)*

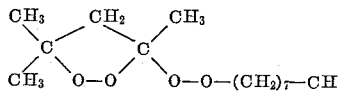

1.73 parts by weight (1 mole) of n-octyl hydroperoxide (80%) and 1.32 parts by weight (1 mole) of 3-hydroxy-3,5,5-trimethyl dioxolane-(1,2) are dissolved in 25 parts by volume of ether. While cooling the mixture in an ice bath, 1 part by weight of phosphorus pentoxide is added. After keeping the mixture 6 hours in the ice bath the solution is drawn off from the phosphorus pentoxide which has become amorphous and compact. The solution is washed three times with 2 N sodium hydroxide solution, twice with water and dried over sodium sulfate. The ether is removed in the vacuum of a water jet vacuum pump, n-octylalkohol and n-octyl hydroperoxide are distilled off in a high vacuum. 2 parts by weight of 3-n-octyl peroxy-3,5,5-trimethyl dioxolane remain as residue corresponding to a yield of 77% of the theoretical yield.

Properties: Colorless oil which cannot be distilled.
Refractive index: $n_D^{21}$=1.4366.

Example 6

*3-[Tetralylperoxy-(1')]-3,5,5-Trimethyl Dioxolane-(1,2)*

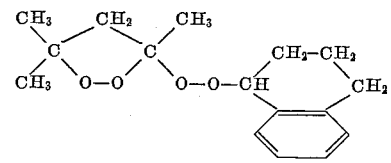

4.1 parts by weight of tetralylhydroperoxide and 3.3 parts by weight of 3-hydroxy-3,5,5-trimethyl dioxolane-(1,2) are dissolved in 25 parts by volume of ether. While cooling the mixture in an ice bath 2 parts of phosphorus pentoxide are added. The further procedure is the same as described herein above in Example 5. After removing the ether 3 parts by weight of a colorless sirup remain as residue corresponding to a yield of 43% of the theoretical-yield. After a few days in the ice box the sirup-like residue will crystallize; the crystals are recrystallized from aqueous methanol. Colorless crystals of the melting point of 81–83° C. are obtained.

EXAMPLE 7

*3-[1'-Ethoxy Propyl-(1')-Peroxy]-3,5,5-Trimethyl Dioxolane-(1,2)*

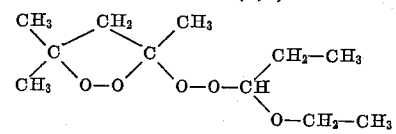

6 parts by weight of 1-ethoxy propyl hydroperoxide and 6.65 parts by weight of 3-hydroxy-3,5,5-trimethyl dioxolane-(1,2) are dissolved in 50 parts by volume of ether. The further procedure is the same as described hereinabove in Example 6. After removing the ether, the residue is subjected to fractional distillation in a high vacuum. The yield is 6 parts by weight corresponding to a yield of 52% of the theoretical yield.

Properties: Colorless liquid.
Refractive index: $n_D^{19.5} = 1.4291$.
Boiling point: 54° C./0.03 mm. Hg.

EXAMPLE 8

*3-Pinan Peroxy-3,5,5-Trimethyl Dioxolane-(1,2)*

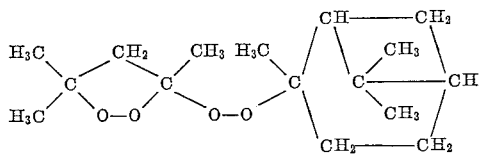

13.2 parts by weight of 3-hydroxy-3,5,5-trimethyl dioxolane-(1,2) and 23.4 parts by weight of a 73% by weight pinan hydroperoxide (refractive index $n_D^{20} = 1.4872$) are mixed with 20 parts by weight of an 50% by weight aqueous solution of p-toluene sulfonic acid while cooling. The reaction mixture is agitated at room temperature for 4 hours and the resulting two layers are separated in a separating funnel. The organic layer is washed twice with 1 N sodium hydroxide solution and twice with water and is dried over magnesium sulfate. The resulting peroxy compound is a colorless liquid.

Properties: Colorless liquid.
Refractive index: $n_D^{20} = 1.4752$.

EXAMPLE 9

*3-(1'-Hydroxy Dicyclohexylperoxide-1'-Peroxy)-3,5,5-Trimethyl Dioxolane-(1,2)*

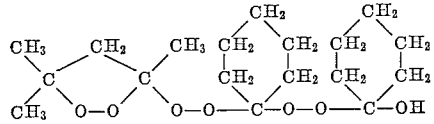

13.2 parts by weight of 3-hydroxy-3,5,5-trimethyl dioxolane-(1,2) are added to a solution of 24.6 parts by weight of 1'-hydroxy-1-hydroperoxy dicyclohexylperoxide in 30 parts by volume of methylene chloride. 20 parts by weight of a 50% by weight aqueous solution of p-toluene sulfonic acid are added while cooling and agitating. The reaction mixture is agitated at room temperature for 4 hours and the resulting two layers are separated in a separating funnel. The organic layer is agitated twice for an hour after addition of a saturated aqueous solution of sodium sulfite to destroy unreacted 1'-hydroxy-1-hydroperoxy dicyclohexylperoxide. Then it is washed twice with 1 N sodium hydroxide solution and three times with water and is dried over magnesium sulfate. Methylene chloride and cyclohexanone are distilled off in a high vacuum. 16.2 parts by weight of the peroxy compound remain as residue corresponding to a yield of 45% of the theoretical yield.

Properties: Colorless liquid of high viscosity which cannot be distilled.
Refractive index: $n_D^{20} = 1.4811$.

In place of ethyl hydroperoxide, cumene hydroperoxide, butyl hydroperoxide, n-octyl hydroperoxide, tetralyl hydroperoxide, 1-ethoxy propyl hydroperoxide, pinane hydroperoxide, 1'-hydroxy-1-hydroperoxy dicyclohexyl peroxide as used in the preceding examples, there may be employed equimolecular amounts of other alkyl, cycloalkyl, (1-alkoxy)-alkyl and aralkyl hydroperoxides, such as propyl hydroperoxide, isopropyl hydroperoxide, n-butyl hydroperoxide, isoamyl hydroperoxide, n-amyl hydroperoxide, isobutyl hydroperoxide, benzyl hydroperoxide, phenyl ethyl hydroperoxide, 2- or 4-methyl benzyl hydroperoxide, diphenyl methyl hydroperoxide, triphenyl methyl hydroperoxide, diisopropyl phenyl hydroperoxide, decalin hydroperoxide, menthane hydroperoxide, 1,1'-hydroxy dicyclohexylperoxide and the like while otherwise the procedure is the same as described in the preceding examples.

EXAMPLE 10

23.5 parts by weight of diacetone alcohol are mixed with 35 parts by weight of an aqueous 30% hydrogen peroxide solution and 150 parts by volume of 5 N sulfuric acid. The mixture is allowed to stand at room temperature for 65 hours. The precipitated crystals of mesityl oxide peroxide are filtered off by suction. They are washed repeatedly with water and are then dried by exposure to the atmosphere. The yield is 13.1 parts by weight.

Of course, many changes and variations in the alkyl or aralkyl hydroperoxides used as reaction components, in the acid catalysts, in the reaction conditions, temperature, and duration, in the method of working up the reaction product and of purifying the same, and the like may be made by those skilled in the art in accordance with the principles set forth herein and in the claims annexed hereto.

We claim:
1. In a process of producing mesityl oxide peroxide, the step which comprises reacting diacetone alcohol and hydrogen peroxide in the presence of an acidic catalyst selected from the group consisting of sulfuric acid, sulfonic acid, perchloric acid, and phosphorus pentoxide.
2. 3-ethyl peroxy-3,5,5-trimethyl dioxolane-(1,2).
3. 3-cumyl peroxy-3,5,5-trimethyl dioxolane-(1,2).
4. 3-tertiary butyl peroxy-3,5,5-trimethyl dioxolane-(1,2).
5. 3-n octyl peroxy-3,5,5-trimethyl dioxolane-(1,2).
6. 3-[tetralylperoxy-(1')] - 3,5,5 - trimethyl dioxolane-(1,2).
7. 3-[1'-ethoxy propyl peroxy-(1')]-3,5,5-trimethyl dioxolane-(1,2).
8. 3-(1''-hydroxy dicyclohexyl peroxide-1'-peroxy)-3,5,5-trimethyl dioxolane-(1,2).
9. 3-pinane peroxy-3,5,5-trimethyl dioxolane-(1,2).
10. A 3,5,5-trimethyl dioxolane-(1,2) of the formula

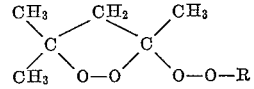

wherein
R is a member selected from the group consisting of lower alkyl having 1 to 8 carbon atoms, pinanyl, 1-hydroxy dicyclohexyl peroxide, menthyl, decahydronaphthyl, (1-lower alkoxy)-lower alkyl and phenyl lower alkyl.

References Cited in the file of this patent
UNITED STATES PATENTS
2,668,180    Boardman _____ Feb. 2, 1954
FOREIGN PATENTS
1,093,375    Germany _____ Nov. 24, 1960
OTHER REFERENCES
Payne: J. Org. Chem., vol. 23, pages 310–11 (1958).